United States Patent [19]

Asslaender et al.

[11] Patent Number: 4,830,286

[45] Date of Patent: May 16, 1989

[54] ELECTROMAGNETICALLY ACTUATABLE VALVE

[75] Inventors: Peter Asslaender, Bamberg; Udo Hafner, Lorch; Ferdinand Reiter, Markgroningen, all of Fed. Rep. of Germany

[73] Assignee: Robert Bosch GmbH, Stuttgart, Fed. Rep. of Germany

[21] Appl. No.: 184,904

[22] Filed: Apr. 22, 1988

[30] Foreign Application Priority Data

May 2, 1987 [DE] Fed. Rep. of Germany ....... 3714693

[51] Int. Cl.[4] .......................... B05B 1/30; F16K 31/02

[52] U.S. Cl. ................................ 239/585; 251/129.16; 251/129.17

[58] Field of Search ................... 239/585; 251/129.16, 251/129.17

[56] References Cited

U.S. PATENT DOCUMENTS 2,881,980 4/1959 Beck et al. ..................... 251/129.16
4,356,980 11/1982 Krauss ................................ 239/585
4,390,130 6/1983 Linssen ................................ 239/585
4,471,914 9/1984 Hafner ................................ 239/585

FOREIGN PATENT DOCUMENTS 3501973 7/1985 Fed. Rep. of Germany .

*Primary Examiner*—Andres Kashnikow
*Assistant Examiner*—Patrick N. Burkhart
*Attorney, Agent, or Firm*—Edwin E. Greigg

[57] ABSTRACT

In valves having flat armatures, in order to attain the shortest possible switching times, the goal is to reduce the mass of the armature and the surface area of the stops. A particularly advantageous design is obtained by embodying the flat armature in the manner of a gear wheel and providing at least three radially extending teeth, spaced uniformly apart from one another, on which the stop lobes that cooperate with a stop integral with the housing upon actuation of the valve by excitation of the magnetic coil are formed. A flat armature embodied in this way can be used in any correspondingly embodied valve.

7 Claims, 1 Drawing Sheet

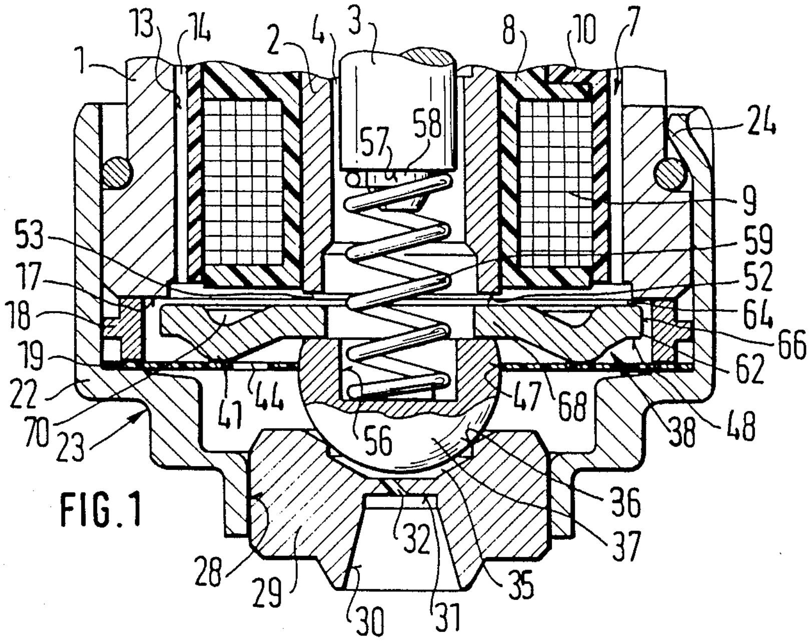
FIG.1
FIG. 2
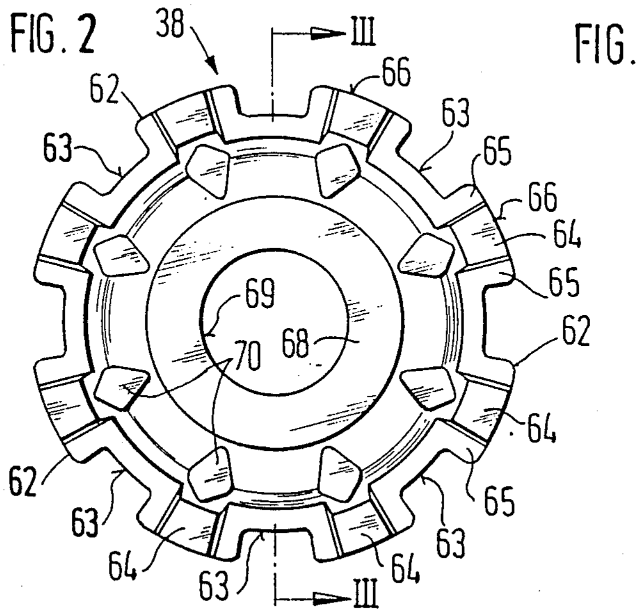
FIG. 3
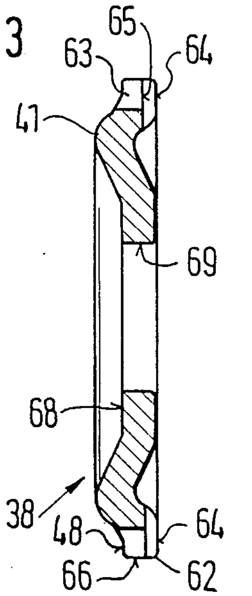

ELECTROMAGNETICALLY ACTUATABLE VALVE

BACKGROUND OF THE INVENTION

The invention is based on a valve as generically defined hereinafter. German Offenlegungsschrift No. 35 01 973 discloses a valve having the disadvantage that despite reducing the size of the surfaces of the armature and stop that strike one another, a substantial reduction in the armature mass is still unattainable, and upon armature actuation a large surface area must be moved counter to the fluid, resulting in undesirable delays in the closing or opening movement of the valve.

This application is an improvement of U.S. Pat. No. 4,733,822, granted Mar. 29, 1988, which is assigned to the assignee of this application.

OBJECT AND SUMMARY OF THE INVENTION

The valve having the armature embodied according to the invention has the advantage over the prior art that a reduction in the armature mass and of the armature surface area that must be moved through the medium is attainable while maintaining adequate rigidity, resulting in faster armature actuation and hence shorter valve opening and closing times.

It is advantageous if each stop lobe protrudes axially beyond the tooth surface and is narrower than a tooth.

It is also advantageous to produce the flat armature from soft magnetic material by sintering.

The invention will be better understood and further objects and advantageous thereof will become more apparent from the ensuing detailed description of a preferred embodiment taken in conjunction with the drawings.

BRIEF DESCRIPTION OF THE DRAWINGS

FIG. 1 is a fragmentary cross-sectional view of a fuel injection valve provided with an armature according to the invention;

FIG. 2 is a top plan view on an armature according to the invention; and

FIG. 3 is a section taken along the line III—III of FIG. 2.

DESCRIPTION OF THE PREFERRED EMBODIMENT

The fuel injection valve for a fuel injection system which is shown by way of example in FIG. 1 serves for instance to inject fuel into the intake tube of mixture-compressing internal combustion engines having externally supplied ignition. A liner 2 of ferromagnetic material is secured in a cylindrical, ferromagnetic valve housing and simultaneously acts as the core. A cylinder 3 is positioned within the liner 2 and is guided inside the liner 2 in the portion of the valve that is not shown. Between the cylinder 3 and the liner 2 there is an annular gap 4, through which the valve is vented. An insulating holder body 8 is mounted on the outside diameter of the liner 2, in the interior 7 of the valve housing 1 between the liner 2 and the valve housing 1; the holder body 8 at least arranged to partly surround a magnetic coil 9 disposed coaxially with the valve housing 1 and liner 2. The holder body 8 and magnetic coil 9 are surrounded by an insulator 10 and are secured on the valve housing 1 by means of an element, not shown but made of the same material as the insulator 10. Inside the element, and again not shown in the drawing, there is an electric connection line leading to the magnetic coil 9. An annular gap 14, through which the fuel flow enters, is left between the outside diameter of the insulator 10 and the housing bore 13 surrounding the interior 7 of the valve housing 1. A spacer ring 18 rests on an end face 17 of the valve housing 1 oriented toward the intake manifold of the engine, and the spacer ring 18 is adjoined by a guide diaphragm 19. The other side of the guide diaphragm 19 is engaged by a collar 22 of a nozzle holder 23, which partly surrounds the valve housing 1 and is crimped at 24 to the valve housing 1, thereby exerting an axial clamping force for the positional fixation of the spacer ring 18 and guide diaphragm 19. Remote from the valve housing 1, the nozzle holder 23 has a coaxial receiving bore 28, into which a nozzle body 29 is inserted and secured, for instance by welding or soldering. The nozzle body 29 has a preparation bore 30, for instance of frustoconical shape, opening in the direction remote from the valve, and at least one fuel guide bore 32 which serves to meter fuel discharged at the bottom 3 of the preparation bore 30. To make the fuel more turbulent, the fuel guide bore 32 may discharge onto the bottom 31 at a tangent. The fuel guide bores 32 begin at a spherical chamber 35 formed in the nozzle body 23, upstream of which a circular valve seat 36 is formed in the nozzle body 29, with a valve closing element 37 of approximately hemispherical shape being arranged to cooperate with the valve seat 36.

Remote from the valve seat 36, the valve closing element 37 is connected to a flat armature 38. The flat armature 38 has an annular ring 41, which is axially raised toward the valve seat 36 and rests on the side of the guide diaphragm 19 remote from the valve seat 36. Flow apertures 44 in the guide diaphragm 19 enable an unhindered flow of fuel around the flat armature 38 and the guide diaphragm 19. The guide diagram 19, which is fastened integrally with the housing on its outer circumference, between the spacer ring 18 and the collar 22 of the nozzle holder 23, ha a centering opening 47, through which the movable valve closing element 37 protrudes and by which this element is guided in the radial direction. The fastening of the guide diaphragm 19 integrally with the housing between the spacer ring 18 and the collar 22 of the nozzle holder 23 is effected in a plane which, when the valve closing element 37 is resting on the valve seat 36, passes through the center, or as close as possible to the center, of the ball-like valve closing element. By means of the guide diaphragm 19 resting on the ring 41 of the flat armature 38, the flat armature 38 is guided as nearly parallel as possible to the end face 17 of the valve housing 1, the flat armature 38 being adapted to protrude somewhat beyond this end face 17 with an outer magnetic zone 48. A second magnetic zone exists between the end face 52 of the liner 2 and the flat armature 38. When current is flowing through the magnetic coil, the flat armature 38 rests with its outer magnetic zone 48 on the end face 17 of the valve housing 1, while between the flat armature 38 and the end face 52 of the liner 2 a gap 53 remains. A compression spring 59 is supported in an indentation bore 56 in the valve closing element 37 and on the other end is supported on a step 57 of the cylinder 3, being centered by a protruberance 58 formed on the cylinder 3.

As also shown in FIGS. 2 and 3, the flat armature 38 is embodied in the form of a gear wheel and has at least three teeth 62, extending radially outward from the ring 41. In the exemplary embodiment shown, eight teeth 62 are provided. Between the teeth 62, tooth gaps 63 are provided, which like the teeth 62 are virtually rectangular in cross section. A stop lobe 64 of relatively large surface area is provided on each tooth 62, and like the teeth 62, these stop lobes 64 are located in the outer magnetic zone 48 of the flat armature 38, and being oriented toward the end face 17 of the valve housing 1 and are adapted to rest on the end face 17 when the magnetic coil 9 is excited. The stop lobes 64 of the flat armature 38 terminate at the same height, or in other words all terminate in a single plane. Each of the stop lobes 64 which protrude beyond the tooth surface 65 extends radially inward from the end face 66 of a given tooth 62 and is narrower than that tooth. A central face 68 extends from the annular ring 41 on the side oriented toward the valve seat 36, remote from the teeth 62; the valve closing element 37 is arranged to rest on this central face 68 and is secured to it, for example by welding. The central face 68 is interrupted by a central bore 69, through which the compression spring 59 protrudes. On the surface of the flat armature remote from the valve seat 36, there is a radially extending reinforcement rib 70 oriented toward each tooth 62 and spanning the ring 41. Advantageously, the flat armature 38 is made from soft magnetic material by sintering.

Because of its gear-wheel-like shape, the flat armature 38 embodied according to the invention has the advantage that the large tooth gaps 63 provided between the teeth 62 reduce the mass of the flat armature substantially, while lending it sufficient strength, and at the same time the medium to be controlled can flow around the flat armature sufficiently well upon a movement of the flat armature, thus assuring very fast actuation of the flat armature and hence of the valve wheel like device. In the claims reference is made to the gear wheel-like device having a root area 63 and the teeth 62 having opposed flank portions all of which is considered clearly shown from the plan view of FIG. 2.

The foregoing relates to a preferred exemplary embodiment of the invention, it being understood that other variants and embodiments thereof are possible within the spirit and scope of the invention, the latter being defined by the appended claims.

What is claimed and desired to be secured letters patent of the United States is:

1. An electromagnetically actuatable valve for fuel injection systems of internal combustion engines comprising a valve housing of ferromagnetic material, a valve seat, a valve closing element, a magnetic coil, and a flat armature arranged to engage said valve seat, said flat armature configured in the manner of a gear wheel having a plurality of radially protruding teeth spaced uniformly apart from one another, each of said teeth on said flat armature having stop lobes disposed on a surface thereof remote from said valve closing element, said stop lobes arranged to rest on a stop face upon excitation of said flat armature during excitation of said magnetic coil.

2. A valve as defined by claim 1, in which each said stop lobe protrudes in an axial direction beyond the tooth surface.

3. A valve as defined by claim 1, in which each said stop lobe is narrower than said tooth upon which it is disposed.

4. A valve as defined by claim 1, in which each said tooth includes opposed flank portions and a root zone which provide a virtually rectangular cross section.

5. A valve as defined by claim 1, in which said flat armature is made from sintered soft magnetic material.

6. A valve as defined by claim 5, in which said flat armature on its side oriented toward the valve seat further includes a flat central face for affixation of said valve closing element, said flat central face surrounded by an annular ring which offstands axially in an axial direction toward the valve seat and adjoined by the teeth (62).

7. A valve as defined by claim 6, in which a zone adjacent to each tooth is provided with a reinforcing rib that extends in a radial direction and spans said annular ring, each said rib being oriented toward the surface of said flat armature remote from said valve seat (36).

* * * * *